(No Model.)

H. A. LUDWIG & P. S. REID.
JOINT FOR SPECTACLE BOWS.

No. 355,830. Patented Jan. 11, 1887.

Witnesses
S. W. Fowler
H. B. Applewhite

Inventors,
Henry A. Ludwig,
Philip S. Reid,
By their Attorney
Thomas P. Kinsey

N. PETERS. Photo-Lithographer. Washington, D. C.

United States Patent Office.

HENRY A. LUDWIG AND PHILIP S. REID, OF PHILADELPHIA, PA.

JOINT FOR SPECTACLE-BOWS.

SPECIFICATION forming part of Letters Patent No. 355,830, dated January 11, 1887.

Application filed May 10, 1886. Serial No. 201,649. (No model.)

*To all whom it may concern:*

Be it known that we, HENRY A. LUDWIG and PHILIP S. REID, citizens of the United States, residing at the city of Philadelphia, county of Philadelphia, State of Pennsylvania, have invented a new and useful Improvement in Spectacle-Frames, of which the following is a specification.

This invention is applicable to all spectacle-frames connected with the temples by a bifurcated, recessed, or plain joint.

The object of the improvement is to furnish a joint that will in constant daily use remain a snug fit, the joint working smoothly, and the temple remaining in any position radial to the joint-pivot in which it may be placed.

It is well known both to users and non-users that the great defect in spectacle-frames is the want of stability in the temple-joint of the side pieces of the eye-frame, causing great annoyance to the wearer of spectacles. This we have overcome in a very simple and inexpensive manner, and the improvement is adapted to be applied to both new and old spectacle-frames.

The drawings herewith, forming a part of this specification, disclose the nature of our improvement, like letters of reference indicating similar parts.

Figure 1:
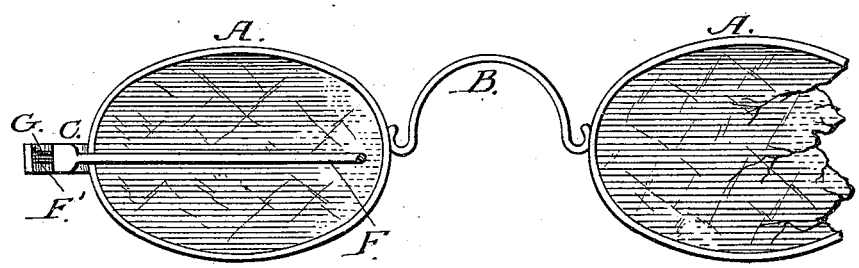
Figure 2:
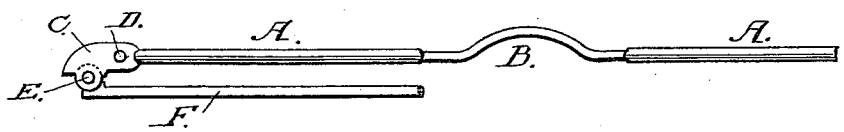
Figure 3:
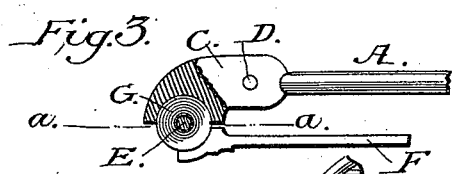
Figure 5:
Figure 4:
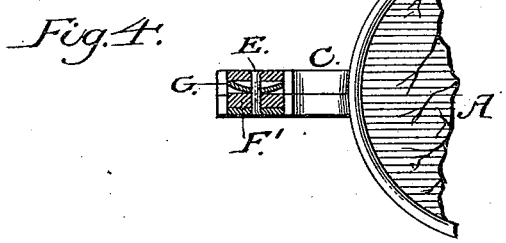
Figure 6:

Figure 1 represents, in an enlarged elevation, a portion of a spectacle-frame with our improvement attached thereto; Fig. 2, a plan of the same; Fig. 3, a plan of the side piece, a portion of the eye-frame and temple, the upper jaw of the side piece partially removed, showing our improved joint; Fig. 4, a partial rear elevation with a section through the side piece and temple-joint on the line *a a* of Fig. 3. Fig. 5 represents one form of tension-joint washer in plan and section. Fig. 6 represents an alternate form of the same.

To adapt our improvement to spectacle-frames already manufactured for sale or in use, the temple F is removed from the side piece, C, and either the recess in the side piece milled out, so as to equally reduce the thickness of the jaws, and thereby enlarge the space between the same, or the temple-hinge joint F' is reduced in thickness upon one face only. In the first case, to complete the joint on assembling of parts and retain the temple central thereto would require shiming out on both sides of the temple-joint piece F'. In the latter case the piece F' would require shiming only upon one side of the same to preserve its coincidence with the side-piece faces. For new work the hinge-joint F' of the temple would be constructed of the proper thickness to leave room in the recess for the tension-washers G or H. We give preference to the latter mode of construction, and fill out the space thus left between the hinge-joint face and the inner face of the recess of the side piece, C, by a spring-washer, G or H, of a dished form, in its normal state slightly higher from outside of disk edge to top of crown than the unoccupied space within the recess. The temple-joint piece is inserted and the washer slipped in over the same, a temporary pivot inserted, and the locking-pin D screwed down until the jaws of C contact, which brings a compressive force upon the washer, which is resisted by a tensional pull upon the pivot E, which is riveted in place. When this is done, the temple will remain in any position in which it may be placed, no matter how the spectacles are held in the hand, yet a free movement will be retained upon the pivot E, securing the joint. For very light frames a more flexible spring-washer is desirable, and for that class of goods we merely split the washer radially, as shown at H. It then gives to a lighter compressive force from the locking-screw D, and throws less strain upon the jaws of the eye-piece C. In the illustration A is the frame of the spectacles, and B the nose-bow.

We prefer to make the spring-washers of thin steel and temper them to suit the material of the various styles of frames in which they may be placed, so that the same shall be just sensibly harder than the eye-pieces, yet preserve elasticity sufficient to keep a constant tension upon the joint-pin, with a compressive pressure upon the joint-piece of the temple. Should the wear at any time exceed the spring of the washer, the end pieces would be separated and their contacting faces filed off. On reassembling the washer would resume its function and the joint would be found as satisfactory as before.

We have practically tested this joint, and after a continuous and severe use find no appreciable looseness in the same, and no dropping of the temple from its own weight, so common in the spectacles ordinarily used.

Having shown our improvement, described its construction and advantages, we desire to claim as follows:

1. As an improvement in spectacle-frames, the side pieces provided with a recess to receive, in addition to the temple-hinge end, a spring-disk washer, G, of a dished form, in combination with the locking-screw D and pivot E, substantially as and for the purpose set forth.

2. The eye side pieces, C, of the spectacle-frame A and the recess-joint in the same, a temple-joint piece, F', having its thickness reduced upon one face and the intervening space filled out with a spring-disk washer, in combination with the pivot E and locking-screw D, substantially as and for the purpose described.

HENRY A. LUDWIG.
PHILIP S. REID.

Witnesses:
HENRY STUEBNER,
LEWIS L. YEAGER.